United States Patent Office 3,694,373
Patented Sept. 26, 1972

3,694,373
PRODUCTION OF REDUCING GAS
Warren G. Schlinger, Pasadena, and William L. Slater, La Habra, Calif., and Roger M. Dille, Richmond, Va., assignors to Texaco Inc., New York, N.Y.
No Drawing. Continuation-in-part of application Ser. No. 879,926, Nov. 25, 1969, which is a continuation-in-part of application Ser. No. 732,908, May 29, 1968, now Patent No. 3,528,930, which is a continuation-in-part of application Ser. No. 510,038, Nov. 26, 1965, which in turn is a continuation-in-part of application Ser. No. 285,868, June 6, 1963. This application Apr. 19, 1971, Ser. No. 135,359
Int. Cl. C01b 2/14
U.S. Cl. 252—373                6 Claims

ABSTRACT OF THE DISCLOSURE

A gas having a reducing ratio (mols of $CO+H_2$ to mols of $CO_2+H_2O$) of at least 10 is produced by partial combustion of a hydrocarbon oil with oxygen of at least 95% purity, the oil being introduced as a liquid mixture with water into the reaction zone. Temperature in the reaction zone is maintained below about 3000° F. and the product gas contains as free carbon not more than 2 weight percent of the carbon content of the feed.

---

This application is a continuation-in-part of our copending application, Ser. No. 879,926 filed Nov. 25, 1969, now abandoned which in turn is a continuation-in-part of our application, Ser. No. 732,908, filed May 29, 1968, now U.S. Pat. 3,528,930, which in turn is a continuation-in-part of our application, Ser. No. 510,038, filed Nov. 26, 1965, now abandoned, which in turn is a continuation-in-part of our application, Ser. No. 285,868, filed June 6, 1963 and now abandoned.

This invention relates to the process for the production of reducing gas from liquid hydrocarbons by direct partial oxidation with an oxygen-containing gas. In one of its more specific aspects, the present invention relates to a non-catalytic process for generating reducing gas in which liquid water is supplied to the reaction zone. In another of its more specific aspects, the invention relates to the method of generating reducing gas by direct partial oxidation wherein water is mixed with hydrocarbon oil and the mixture is charged to a reaction zone in liquid phase and reacted with oxygen at an autogenous temperature in the range of 1800° to 3000° F.

The generation of carbon monoxide and hydrogen, or synthesis gas, by non-catalytic reaction of hydrocarbons with oxygen or oxygen-enriched air, in the presence of steam, is known. Partial oxidation of normally liquid hydrocarbons, especially heavy fuel oils, is a highly economical method of producing synthesis gas in quantity. In the partial oxidation process, liquid hydrocarbon is reacted with oxygen and steam in a closed, compact reaction zone in the absence of catalyst or packing at an autogenous temperature within the range of about 1800 to 3200° F., preferably in the range of about 2200 to 2800° F. The hydrocarbon oil is usually partly or completely vaporized and mixed with or dispersed in steam. The hydrocarbon oil and steam are usually preheated to a temperature in the range of 500 to 800° F., generally to a temperature of at least 600° F., whereas oxygen usually is not preheated. The reaction zone is usually maintained at a pressure above about 100 pounds per square inch gauge, e.g., 600 to 1000 p.s.i.g.; recent trends are toward higher operating pressures up to about 2500 to 3000 p.s.i.g. The product gas stream consists primarily of carbon monoxide and hydrogen and contains smaller amounts of carbon dioxide, steam, methane and entrained carbon. Solid carbon produced in the process is liberated in very fine particle form which is easily wet by water.

The amount of oxygen supplied to the reaction zone is limited so that near maximum yields of carbon monoxide and hydrogen are obtained. Usually it is preferable to employ high purity oxygen, i.e., oxygen-rich gas streams containing in excess of 95 mol percent oxygen. Such oxygen concentrates are readily available from commercial oxygen plants.

Product gases issuing from the gas generation reaction zone contain a large quantity of heat. The heat may be employed advantageously to convert water to steam either by direct contacting of the hot gas stream with water or by passing the hot gas stream through a suitable heat exchanger, such as a waste heat boiler.

Generally it is desirable to operate the synthesis gas generator so that at least about two percent of the carbon contained in the hydrocarbon supplied to the gas generator is liberated as free carbon which is entrained in the product gas leaving the gas generator. Entrained carbon in the synthesis gas stream is effectively removed by contacting the gas stream with water in a suitable gas-liquid contact apparatus, for example a spray tower, bubble plate contactor, or packed column.

The present invention is directed to the production of a specific type of gas mixture, namely reducing gas such as can be used for example in the reduction of ores. The problems encountered in the production of reducing gas are varied and somewhat distinct from those encountered in the conventional production of synthesis gas. A reducing gas for the purposes of this invention is a gas having a reducing ratio of at least 10 and preferably at least 15. Reducing ratio is defined as the ratio of mols of $CO+H_2$ to mols of $CO_2+H_2O$.

Obviously, to produce a gas of high reducing ratio it is necessary to minimize the content of $CO_2$ and $H_2O$ in the product gas. Since a reducing gas is generally used as produced except possibly for partial cooling, it is also desirable to keep the free carbon content of the reducing gas to a minimum. Commercially it is desirable to limit the free carbon content of the reducing gas to not greater than 2% and in some cases to 1% or less by weight based on the carbon content of the charge.

The production of reducing gas by the partial combustion of a hydrocarbon liquid is more complicated than the production of synthesis gas by the same reaction. For example, in the conventional manufacture of synthesis gas, free carbon is deliberately produced. This is not considered undesirable and in fact when heavy oils containing metallic components are present in the charge stock, carbon formation is advantageous as the free carbon serves to sequester the small particles of ash formed by the partial combustion reaction. Even if no metal-containing compounds are present in the charge, carbon production in synthesis gas generation is not considered harmful as conventionally, for the production of hydrogen, the synthesis gas is scrubbed with water both for cooling and for carbon removal. However, since reducing gas is frequently used as produced, there are instances where the presence of free carbon is undesirable. In situations where it is necessary to cool the reducing gas prior to use, cooling is preferably effected by indirect heat exchange. To cool the reducing gas by direct heat exchange as by water injection or scrubbing would impair its value as a reducing gas because the $H_2O$ content of the gas would increase and its reducing ratio would correspondingly be decreased.

It is possible to minimize the formation of carbon or soot by increasing the amount of oxygen introduced into the reactor. However this generally results in reaction temperatures in excess of 3200° F. and unfortunately such high temperatures cannot be maintained for prolonged periods of time without damage to the refractory lining of the reaction chamber. It is also possible to reduce the soot content of the product gas by introducing steam into the reaction zone. Such a procedure is satisfactory in the production of synthesis gas but is extremely undesirable when the product is intended for use as a reducing gas since the presence of steam in the product lowers the reducing ratio.

It is an object of the present invention to produce a reducing gas comprising hydrogen and carbon monoxide having a reduced ratio of at least 10. Another object is to produce a reducing gas having a free carbon content of not more than 2%. Another object is to produce a reducing gas at a temperature not greater than 3000° F. These and other objects will be obvious to those skilled in the art from the following disclosure.

According to our invention, there is provided a process for the production of a reducing gas having a reducing ratio of at least 10 which comprises subjecting a normally liquid hydrocarbon to partial combustion at a temperature 3000° F. with oxygen having a purity of at least 95% using a water to oil weight ratio of not more than 0.19 and introducing all of the $H_2O$ required for the reaction into the reaction zone in the form of a liquid.

Although various hydrocarbon liquids such as naphtha, kerosene and the like may be used as feed stocks for the process, hydrocarbon oils having an API gravity of less than 10° API are preferred. Heavy oils which are suitable for use in the process include, for example, heavy distillates, residual fuel oil, bunker fuel oil and No. 6 fuel oil. Preferably the hydrocarbon liquid feed stock has an initial boiling point above the boiling point of water, suitably above 250° F. The fuel oil may be preheated prior to mixing the oil with water but the preheating should be limited to a temperature below the boiling point of water at the pressure at which the mixing takes place. Advantageously, the oil and water are fed into the reaction zone in the form of an emulsion.

Oxygen used in the process of our invention is substantially pure. For the purposes of this invention, the term "oxygen" when used in connection with the partial combustion of the hydrocarbon liquid feed, refers to oxygen having a purity of at least 95%. Preheating of the oxygen is not necessary.

The reactants, oil, water, and oxygen, may be introduced into the reaction zone or gas generator in any known manner. In one embodiment, a converging annular stream of oxygen is discharged at relatively high velocity for example above about 200 feet per second such as 200-400 feet per second axially into the reaction zone. A mixture of oil and water is discharged centrally and axially into the reaction zone into the converging stream of oxygen. Impingement of the streams results in an intimate mixture of oxygen and droplets of oil and water. The velocity of the oil-water stream is preferably in the range of 5-40 feet per second. The relatively high velocity differential between the gas and liquid streams results in effective and efficient atomization of the liquid.

Suitably the pressure in the reaction zone may be maintained between about 1 p.s.i.g. and 250 p.s.i.g. with pressures of 40-60 p.s.i.g. being preferred.

The following examples, which are given for illustrative purposes only, serve to distinguish our process from the prior art processes where steam is used or the free carbon content of the product gas is greater than 2%. In the various runs tabulated below, the combustion chamber is an unpacked refractory-lined generator having a volume of 11.75 cubic feet, the charge is a California reduced crude having an API gravity of 9.7° and the operating pressure is 40 p.s.i.g. In all of the runs, the oil feed rate is 341 pounds per hour with the exception of runs 11W, 12W and 13W where the oil feed rate is 345 pounds per hour. In the headings of the various columns $H_2O/O$ means $H_2O$ to oil weight ratio, O/C means oxygen to carbon atomic ratio, SOC means specific oxygen consumption in CF per MSCF of $H_2$ plus CO produced, temp. refers to the exit gas temperature in °F., RR is reducing ratio and C represents carbon in the product gas. The letters "S" and "W" after a run number indicate whether $H_2O$ is added as steam or water respectively.

| Run No. | H₂O/O | O/C | SOC | Temp. | RR | C |
|---|---|---|---|---|---|---|
| 1W | 0.10 | 1.0 | 306.6 | 2,762 | 16.99 | 2.0 |
| 2W | 0.15 | 1.0 | 306.6 | 2,661 | 12.17 | 2.0 |
| 3W | 0.19 | 1.0 | 306.6 | 2,570 | 10.08 | 2.0 |
| 4W | 0.20 | 1.0 | 306.6 | 2,553 | 9.85 | 2.0 |
| 5W | 0.25 | 1.0 | 306.6 | 2,476 | 7.77 | 2.0 |
| 1S | 0.10 | 1.0 | 306.5 | 3,080 | 17.00 | 2.0 |
| 2S | 0.15 | 1.0 | 306.6 | 3,013 | 12.18 | 2.0 |
| 3S | 0.19 | 1.0 | 306.6 | 2,988 | 9.83 | 2.0 |
| 4S | 0.20 | 1.0 | 306.5 | 2,962 | 9.47 | 2.0 |
| 5S | 0.25 | 1.0 | 306.6 | 2,938 | 7.77 | 2.0 |
| 6W | 0.10 | 0.98 | 300.4 | 2,669 | 18.97 | 3.0 |
| 7W | 0.15 | 0.98 | 300.4 | 2,570 | 13.16 | 3.0 |
| 8W | 0.19 | 0.98 | 300.4 | 2,477 | 10.86 | 3.0 |
| 9W | 0.20 | 0.98 | 300.5 | 2,470 | 10.37 | 3.0 |
| 10W | 0.25 | 0.98 | 300.5 | 2,389 | 8.16 | 3.0 |
| 6S | 0.10 | 0.98 | 300.4 | 3,010 | 18.97 | 3.0 |
| 7S | 0.15 | 0.98 | 300.4 | 2,958 | 13.20 | 3.0 |
| 8S | 0.19 | 0.98 | 300.4 | 2,918 | 10.83 | 3.0 |
| 9S | 0.20 | 0.98 | 300.5 | 2,906 | 10.32 | 3.0 |
| 10S | 0.25 | 0.98 | 300.5 | 2,854 | 8.16 | 3.0 |
| 11W | 0.10 | 1.04 | 322.8 | 2,983 | 12.79 | 1.0 |
| 12W | 0.15 | 1.04 | 322.8 | 2,881 | 10.05 | 1.0 |
| 13W | 0.25 | 1.04 | 322.8 | 2,682 | 6.71 | 1.0 |
| 11S | 0.10 | 1.04 | 322.8 | 3,314 | 12.79 | 1.0 |
| 12S | 0.15 | 1.04 | 322.8 | 3,254 | 9.97 | 1.0 |
| 13S | 0.25 | 1.04 | 322.8 | 3,132 | 6.71 | 1.0 |

It will be noted from all of the above data that only Runs 1W, 2W, 3W, 11W and 12W are satisfactory. Runs 4W and 5W in which the water to oil weight ratios are 0.20 and 0.25 respectively have unsatisfactory reducing ratios. In Runs 1S and 2S the temperature is too high. In Runs 3S, 4S and 5S the reducing ratio is low. In Runs 6W—10W and 6S—10S inclusive, in which the oxygen to carbon atomic ratio is 0.98, there is excessive free carbon in the product gas. Run 13W where the water to oil weight ratio is 0.25 has an unsatisfactory reducing ratio and in Runs 11S—13S inclusive, the operating temperature is too high. From the above, it can be seen that the water to oil weight ratio should not be more than 0.19, the oxygen to carbon atomic ratio should be at least 1 and the $H_2O$ should be introduced into the reaction zone as liquid water.

Obviously, many variations of the invention as hereinbefore set forth may be made without departing from the spirit and scope thereof and therefore only such limitations should be imposed as are indicated in the appended claims.

We claim:

1. A process for the production of a reducing gas having a reducing ratio of at least 10 and a free carbon content of not more than 2% based by weight on the carbon content of the hydrocarbon feed which comprises introducing a normally liquid hydrocarbon-water mixture into a gas generation zone, subjecting said normally liquid hydrocarbon to partial combustion at an autogenously-maintained temperature below 3000° F. with a free oxygen containing gas having an oxygen purity of at least 95% by volume in an amount such that the atomic ratio of free oxygen to carbon in the hydrocarbon feed is at least 1, a pressure between 1 and 250 p.s.i.g. and introducing all of the $H_2O$ required for the reaction into the gas generation zone in the form of liquid water at a water to hydrocarbon weight ratio of not more than 0.19.

2. The process of claim 1 in which the oxygen to carbon atomic ratio is between 1.0 and 1.04 and the carbon content of the product reducing gas is between 1% and 2% based by weight on the carbon content of the hydrocarbon feed.

3. The process of claim 1 in which the water and hydrocarbon are introduced into the gas generation zone in the form of an emulsion.

4. The process of claim 1 in which the oxygen is introduced into the gas generation zone at a velocity of at least 200 feet per second, the water-hydrocarbon mixture is introduced into the gas generation zone at a velocity of less than 100 feet per second and the stream of oxygen is directed to impinge on the mixture stream.

5. The process of claim 4 in which the velocity of the mixture is between 5 and 40 feet per second.

6. The process of claim 1 in which the water to hydrocarbon weight ratio is between 0.1 and 0.15.

References Cited

UNITED STATES PATENTS

| | | | |
|---|---|---|---|
| 2,976,134 | 3/1961 | Paull | 48—215 |
| 3,087,782 | 4/1963 | Whaley | 48—215 X |
| 3,462,250 | 8/1969 | Bedetti | 48—215 X |
| 3,475,160 | 10/1969 | Heinzelmann et al. | 48—214 X |

JOSEPH SCOVRONEK, Primary Examiner

U.S. Cl. X.R.

48—125